(12) United States Patent
Lin

(10) Patent No.: US 7,527,416 B2
(45) Date of Patent: May 5, 2009

(54) LIGHT GUIDE PLATE WITH DIFFRACTION GRATINGS AND BACKLIGHT MODULE USING THE SAME

(75) Inventor: Jhy-Chain Lin, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 166 days.

(21) Appl. No.: 10/970,916

(22) Filed: Oct. 22, 2004

(65) Prior Publication Data

US 2005/0122743 A1    Jun. 9, 2005

(30) Foreign Application Priority Data

Dec. 5, 2003    (TW) ............................... 92134340 A

(51) Int. Cl.
*G02B 6/10*    (2006.01)

(52) U.S. Cl. .................. 362/626; 362/311; 362/339

(58) Field of Classification Search .............. 362/311, 362/339, 614, 619, 620, 625, 623, 626; 385/37
See application file for complete search history.

(56) References Cited

U.S. PATENT DOCUMENTS

| | | | |
|---|---|---|---|
| 5,386,347 A * | 1/1995 | Matsumoto | 362/623 |
| 5,600,455 A * | 2/1997 | Ishikawa et al. | 349/57 |
| 5,703,667 A | 12/1997 | Ochiai | |
| 5,980,054 A * | 11/1999 | Fukui et al. | 362/625 |
| 6,250,767 B1 | 6/2001 | Kusafuka et al. | |
| 6,425,673 B1 * | 7/2002 | Suga et al. | 362/613 |
| 6,612,710 B2 | 9/2003 | Suzuki et al. | |
| 6,773,126 B1 * | 8/2004 | Hatjasalo et al. | 362/601 |
| 7,044,628 B2 * | 5/2006 | Choi et al. | 362/628 |
| 7,085,056 B2 * | 8/2006 | Chen et al. | 359/566 |
| 2004/0125592 A1 * | 7/2004 | Nagakubo et al. | 362/31 |

FOREIGN PATENT DOCUMENTS

| | | |
|---|---|---|
| CN | 02249988.1 | 11/2003 |
| CN | 02250358.7 | 11/2003 |
| JP | 2002-208306 | 7/2002 |
| JP | 2004319252 A * | 11/2004 |

* cited by examiner

*Primary Examiner*—Jong-Suk (James) Lee
*Assistant Examiner*—Leah S Lovell
(74) *Attorney, Agent, or Firm*—Wei Te Chung

(57) ABSTRACT

A light guide plate (12) has a light incidence surface (121) for receiving light, a light emitting surface (123) for emitting light, and a bottom surface (122). The bottom surface has a plurality of diffusion elements (124) arranged thereat. Each diffusion element defines a diffraction grating unit (125) therein. A grating direction of each diffraction grating unit is substantially perpendicular to a main direction of light beams received by the diffraction grating unit. Areas of the diffraction grating units progressively increase with increasing distance away from the light incidence surface. Diffractive capabilities of the diffraction grating units progressively increase with increasing distance away from the light incidence surface. These features improve the overall efficiency of utilization of light, and enable the light emitting surface to output highly uniform light.

8 Claims, 4 Drawing Sheets

LIGHT GUIDE PLATE WITH DIFFRACTION GRATINGS AND BACKLIGHT MODULE USING THE SAME

BACKGROUND OF THE INVENTION

1. Field of the Invention

The present invention relates to a light guide plate utilizing diffraction gratings for controlling of light emission, and to a backlight module for a liquid crystal display using such a light guide plate.

2. Description of Prior Art

A typical liquid crystal display requires a backlight module in order to be able to provide uniform illumination. The performance of the backlight module greatly depends on a light guide plate employed therein. Means for enhancing the uniformity of light that is output from a light guide plate can be classified into two categories. The first category uses geometrical optical means, such as prisms or micro projections. The second category uses wave optical means, such as diffraction gratings. Light guide plates with multifarious configurations of micro projections and prisms have been developed, and some of these light guide plates can generate quite uniform light beams. However, the uniformity provided by projections is relatively low compared with light guide plates having gratings. This is because the gratings of the latter kind of light guide plate can be precisely configured to correspond to the wavelength band of visible light beams, thereby accurately controlling the uniformity of transmission of the light beams. Nevertheless, there are two main problems associated with gratings. Firstly, a grating is subject to becoming worn over time. Secondly, a grating generates spectral phenomena.

Referring to FIG. 7, U.S. Pat. No. 5,703,667 issued on Dec. 30, 1997 discloses a backlight module. The backlight module 1 comprises a light guide plate 2 having a light incidence surface 2c, a bottom surface 2b and a light emitting surface 2a. The backlight module 1 further comprises a fluorescent tube 4 disposed adjacent the light incidence surface 2c, a reflection plate 5 disposed under the bottom surface 2b, and a diffusing plate 6 and a prism plate 7 disposed on the light emitting surface 2a in that order from bottom to top.

A plurality of reflective diffraction grating units 3 is provided on the bottom surface 2b. Each diffraction grating unit 3 comprises a grating part parallel with the fluorescent tube 4, and a non-grating part. Because all the grating parts of the diffraction grating units 3 are arranged in a same direction parallel to each other, the diffraction grating units 3 provide strong diffraction of light beams received from the fluorescent tube 4.

The ratio of a grating part width to a non-grating part width in the diffraction grating units 3 becomes progressively larger with increasing distance away from the light incidence surface 2c. Therefore, light beams that are available in large quantities at places nearer to the light incidence surface 2c undergo weaker diffraction, and light beams that are available only in small quantities at places more remote from the light incidence surface 2c undergo stronger diffraction. As a result, the light emitting surface 2a provides uniform outgoing light beams.

However, in numerous actual applications, the linear fluorescent tube 4 cannot accurately emit light rays in a same direction, or point light source is used instead of the linear fluorescent tube 4. In such cases, the light beams arriving at the bottom surface 2b do not have a same direction. If the light beams are mainly incident on a diffraction grating unit 3 at an angle that is other than orthogonal, the diffraction effect of the diffraction grating unit 3 is relatively weak. As a result, the light guide plate 2 has limited uniformity of outgoing light beams, and provides limited efficiency of utilization of light.

It is desired to provide a backlight module having a light guide plate which overcomes the above-described problems.

SUMMARY OF THE INVENTION

An object of the present invention is to provide a light guide plate for a backlight module which yields high uniformity of outgoing light and which has a high light utilization efficiency.

A light guide plate of the present invention comprises a light incidence surface for receiving light, a light emitting surface for emitting light, and a bottom surface. The bottom surface has a plurality of diffusion elements arranged thereat. Each diffusion element defines a diffraction grating unit therein. A grating direction of each diffraction grating unit is substantially perpendicular to a main direction of light beams received by the diffraction grating unit.

Areas of the diffraction grating units in the diffusion elements progressively increase with increasing distance away from the light incidence surface. This enables the light emitting surface to output highly uniform light.

In addition, grating constants of the diffraction grating units progressively decrease with increasing distance away from the light incidence surface. This also enables the light emitting surface to output highly uniform light.

Furthermore, when a point light source is used, the grating directions of the diffraction grating units vary according to the varying directions of incoming light beams received by the light guide plate. Thus the diffraction grating units provide improved light utilization efficiency.

Other objects, advantages, and novel features of the present invention will become more apparent from the following detailed description when taken in conjunction with the accompanying drawings, in which:

DETAILED DESCRIPTION OF THE INVENTION

Figure 1:
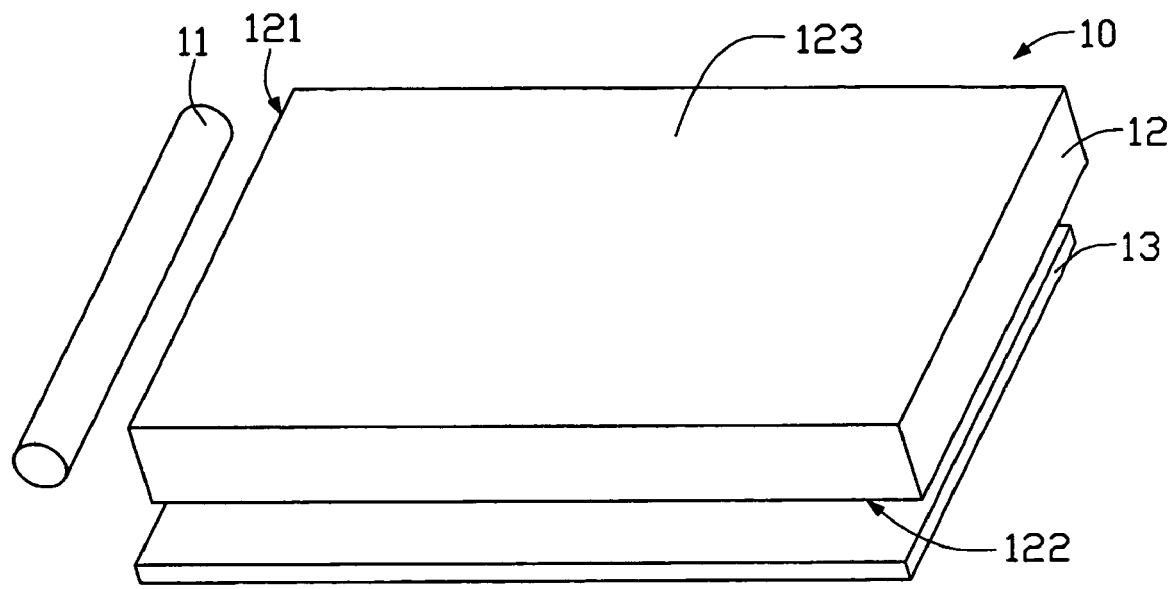
FIG. 1 is a schematic, isometric view of a backlight module having a light guide plate, a light source, and a reflection plate, according to a first embodiment of the present invention.

Referring to FIG. 1, a backlight module 10 according to the first embodiment of the present invention is shown. The backlight module 10 comprises a linear light source 11, a transparent light guide plate-like member 12 having a rectangular cross-section, and a reflection plate 13 arranged under the light guide plate 12. The light guide plate 12 comprises a light emitting surface 123, a bottom surface 122 opposite to the light emitting surface 123, and a light incidence surface 121 adjoining both the light emitting surface 123 and the bottom surface 122. The light source 11 is a CCFL (cold cathode fluorescent lamp) disposed adjacent the light incidence surface 121. The reflection plate 13 is disposed under the bottom surface 122.

Figure 2:
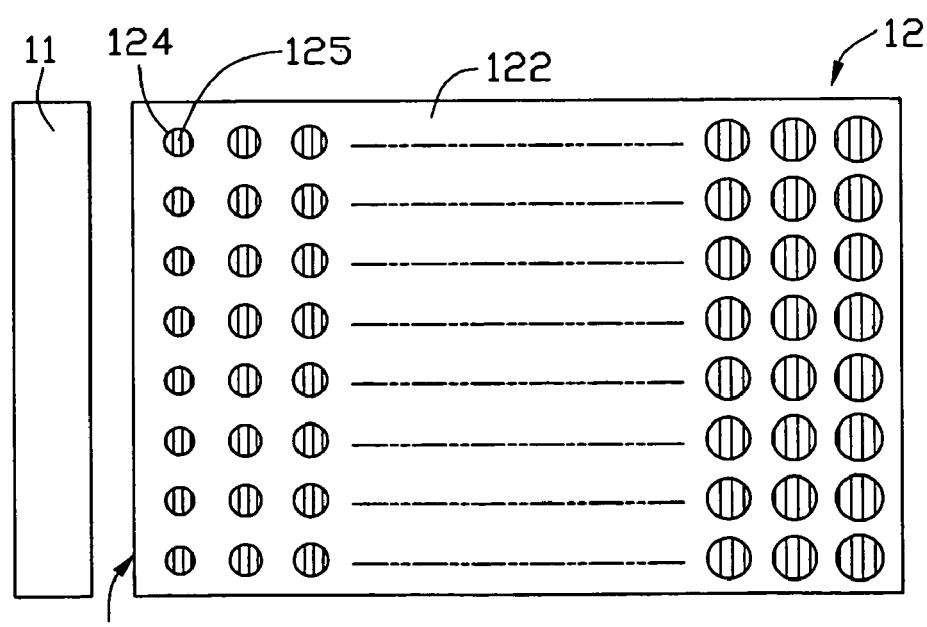
FIG. 2 is a simplified, abbreviated bottom elevation of the light guide plate and light source of FIG. 1, showing a distribution and structure of a plurality of diffraction grating units at a bottom surface of the light guide plate.

Referring to FIG. 2, a plurality of discrete, distinct diffusion elements 124 is arranged in rows and columns at the bottom surface 122 for diffusing light beams. Each diffusion element 124 defines a diffraction grating unit 125 therein. Each diffraction grating unit 125 is composed of a plurality of parallel and equidistant grooves. Grating constants of the diffraction grating units 125 are in the range from 2-5 μm, and preferably 3 μm. Since the CCFL light source 11 mainly emits light beans in a direction perpendicular to the light incidence surface 121, a grating direction of the diffraction grating units 125 is arranged to be parallel wit the light incidence surface 121 for diffracting the light beams with maximum efficiency.

Referring to FIG. 2, areas of the diffusion elements 124 progressively increase with increasing distance away from the light incidence surface 121. Accordingly, areas of the diffraction grating units 125 in the diffusion elements 124 progressively increase, too. The diffraction grating units 125 further from the light incidence surface 121 have larger diffractive areas, and therefore have stronger diffracting capability. Since the intensity of light beams decreases with increasing distance of propagation, the quantity of light beams received by the diffraction grating units 125 decreases with increasing distance away from the light incidence surface 121. The distribution configuration of the diffraction grating units 125 on the bottom surface 122 compensates the light intensity at each diffraction grating unit 125 with a corresponding diffraction capability. Thus, the light guide plate 12 assures uniformity of light beams emitting from the light emitting surface 123. Furthermore, the uniformity of light emitting from the light emitting surface 123 can be controlled by configuring the areas of the diffraction grating units 125 in the diffusion elements 124 accordingly.

In addition, most light sources including the light source 11 irradiate light beams with various wavelengths, and the UV (ultraviolet) light component of the light beams often has a large share of the total light energy. In the backlight module 10, a fluorescent layer (not shown) is provided on the bottom surface 122 to utilize the UV light energy. When UV light impinges on the fluorescent layer, the fluorescent layer emits visible light. This reduces or even eliminates wastage of the UV energy of the light beams, and enhances the brightness of the light beams emitted from the backlight module 10. The fluorescent layer can be made of $SrAl_2O_4$.

Figure 3:
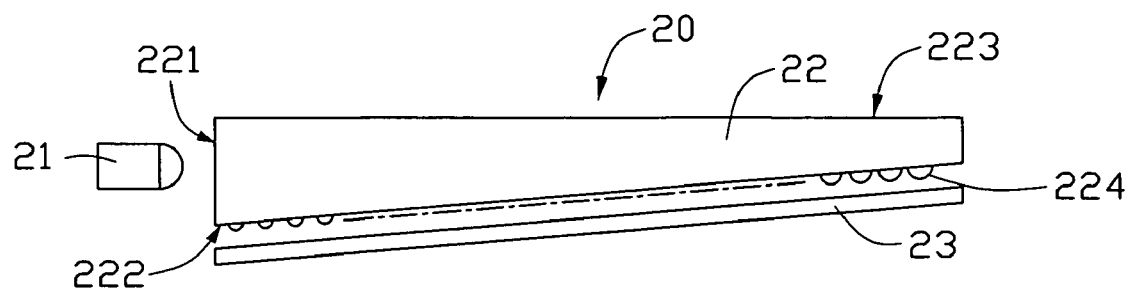
FIG. 3 is a simplified, abbreviated isometric side elevation of a backlight module having a wedge-shaped light guide plate, a light source, and a reflection plate, according to a second embodiment of the present invention.

Referring to FIG. 3, a backlight module 20 according to the second embodiment of the present invention is shown. The backlight module 20 comprises a light source 21, a transparent wedgy light guide plate 22, and a reflection plate 23. The light guide plate 22 comprises a light incidence surface 221, a light emitting surface 223, and a bottom surface 222 opposite to the light emitting surface 223. The light source 21 is an LED (light emitting diode), and is disposed adjacent the light incidence surface 221. In alternative embodiments, two or more LEDs can be employed as the light source 21. The reflection plate 23 is disposed under the bottom surface 222. A plurality of diffusion elements 224 is formed on the bottom surface 222, for diffusing light beams.

Figure 4:
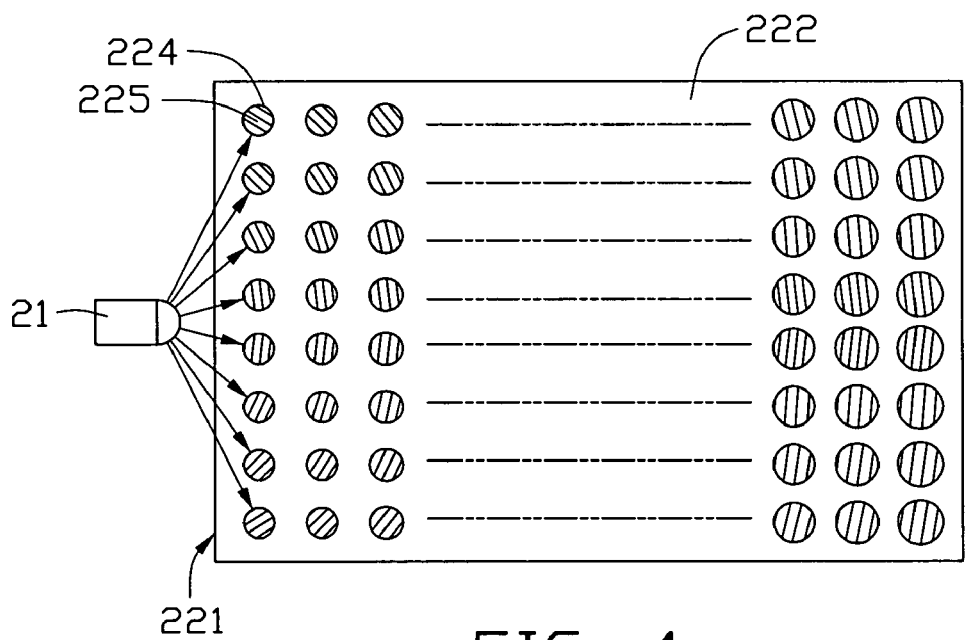
FIG. 4 is a simplified, abbreviated bottom elevation of the light guide plate and light source of FIG. 3, showing a distribution and structure of a plurality of diffraction grating units at a bottom surface of the light guide plate, and showing essential optical paths.

Referring to FIG. 4, each diffusion element 224 defines a diffraction grating unit 225 thereon. Grating constants of the diffraction grating units 225 are in the range from 2-5 μm, and preferably 3 μm. Because the light source 21 is an LED, the light beams emitted therefrom are quite different from the light beams emitted by the CCFL 11 of the backlight module 10 of the first embodiment. Propagation of the light beams emitted by the light source 21 is substantially over a range of different angles. In order to improve the efficiency of light utilization, the diffraction grating units 225 have different grating directions accordingly. For example, the diffraction grating units 225 at the upper, middle and lower positions of the bottom surface 222 have clearly different grating directions respectively, each grating direction being perpendicular to a main direction of incoming light beams. This enables the light guide plate 20 to emit light beams uniformly even though the light source 21 does not irradiate light beams in a single direction.

The backlight module 20 further has a fluorescent layer (not shown) provided on the bottom surface 222, similar to that of the backlight module 10. When UV light impinges on the fluorescent layer, the fluorescent layer emits visible light. This enhances the brightness of the light beams emitted from the backlight module 20. The fluorescent layer can be made of $SrAl_2O_4$.

Figure 5:
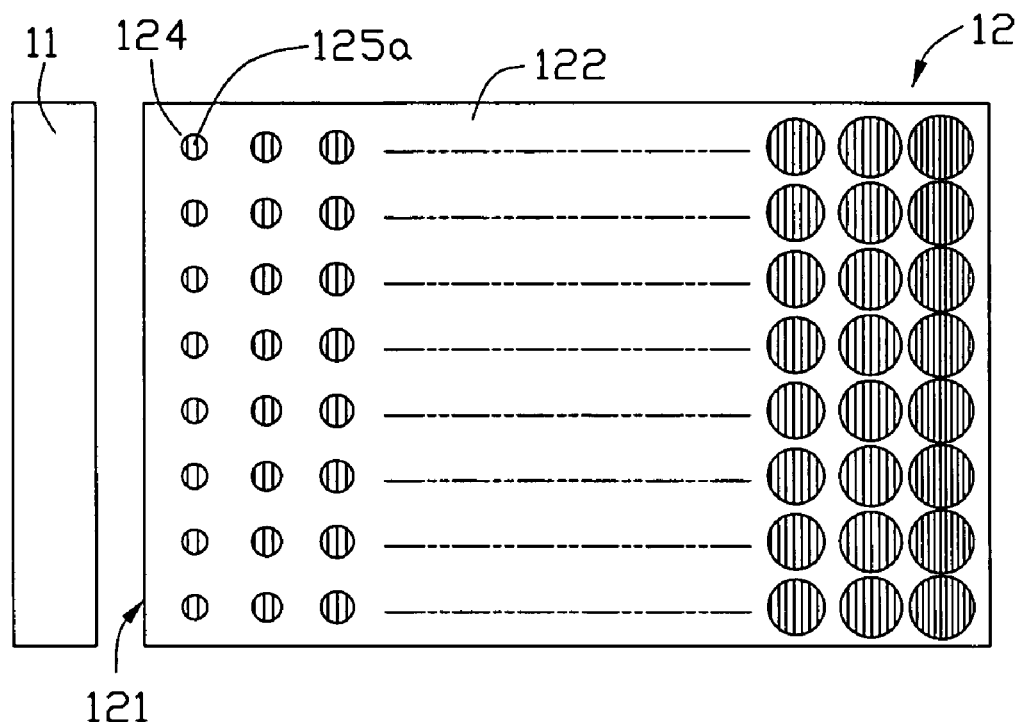
FIG. 5 is similar to FIG. 2, but a light guide plate in accordance with an alternative embodiment, and showing a distribution and structure of a plurality of diffraction grating units at a bottom surface of the light guide plate.
Figure 6:
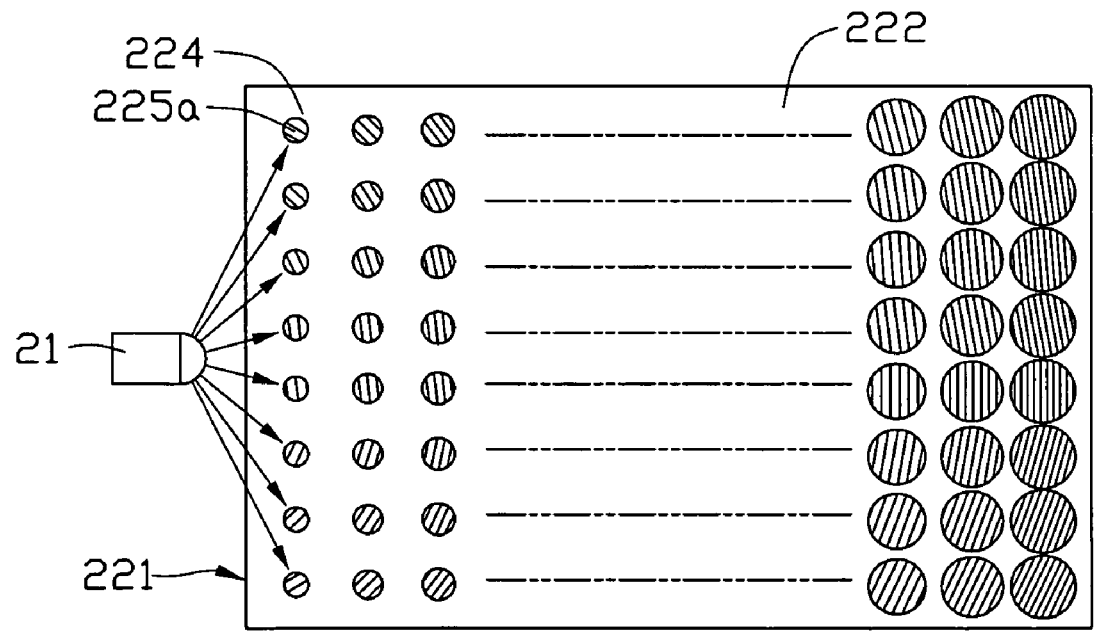
FIG. 6 is similar to FIG. 4, but showing a light guide plate in accordance with an alternative embodiment, and showing a distribution and structure of a plurality of diffraction grating units at a bottom surface of the light guide plate and essential optical paths.
Figure 7:
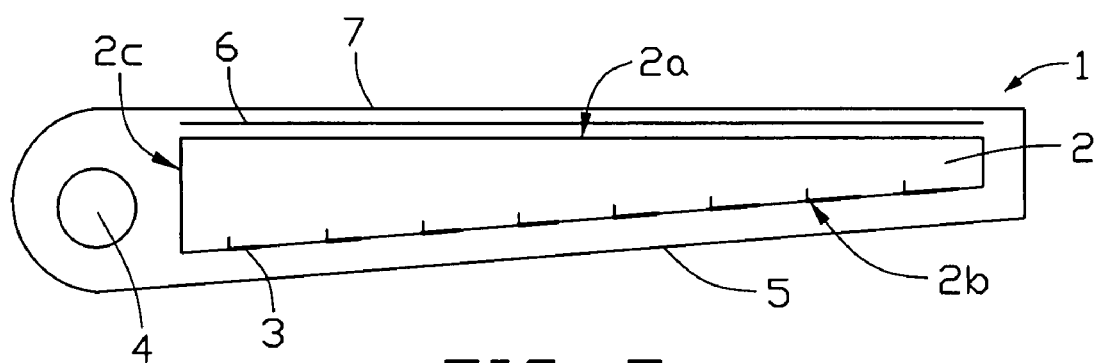
FIG. 7 is a schematic, slide elevation of a conventional backlight module.

The above-described embodiments employ progressively increasing areas of the diffraction grating units 125, 225. Further or alternatively, the grating constants of the diffraction grating units 125, 225 can be varied in order to obtain the desired diffraction capabilities. For example, the grating constants of the diffraction grating units 125, 225 can progressively decrease with increasing distance away from the light incidence surface 121, 221, as shown in FIGS. 5 and 6 respectively with the reference numerals 125a, 225a. In other alternative embodiments, more than one diffraction grating unit 125, 225 may be defined in each of the diffusion elements 124, 224. Whatever embodiment is adopted, the diffraction grating units 125, 225 at various locations have various diffraction capabilities in order to compensate for the differences in intensities of the light beams received thereat.

The diffraction grating units 125, 225 can be formed on the light guide plate 12, 22 by injection molding. For precision, the mold used for such process is itself preferably manufactured by way of laser beam etching or electron beam etching, or another kind of precision process used in the semiconductor field.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A light guide plate, comprising: a light incidence surface for receiving light; a light emitting surface for emitting light; and a bottom surface; wherein the bottom surface has a plurality of discrete diffusion elements arranged in rows and columns thereat, each diffusion element defines a diffraction grating unit therein, each diffraction grating unit being composed of a plurality of parallel and equidistant grooves, end a grating direction of each diffraction grating unit is substantially perpendicular to a main direction of light beams received by the diffraction grating unit, diffractive capabilities of the diffraction grating units progressively increasing with increasing distance away from the light incidence surface.

2. The light guide plate as claimed in claim 1, wherein areas of the diffraction grating units in the diffusion elements progressively increase with increasing distance away from the light incidence surface.

3. The light guide plate as claimed in claim 1, wherein grating constants of the diffraction grating units progressively decrease with increasing distance away from the light incidence surface.

4. The light guide plate as claimed in claim 1, wherein a fluorescent layer is provided on the bottom surface.

5. A backlight module, comprising: a light guide plate which comprises a light incidence surface for receiving light, a light emitting surface for emitting light, and a bottom surface, wherein the bottom surface has a plurality of discrete diffusion elements arranged in rows and columns thereat each diffusion element defines a diffraction grating unit therein, each diffraction grating unit being composed of a plurality of parallel and equidistant grooves, and a grating direction of each diffraction grating unit is substantially perpendicular to a main direction of light beams received by the diffraction grating unit; and a light source adjacent to the light incidence surface, diffractive capabilities of the diffraction grating units progressively increasing with increasing distance away from the tight incidence surface.

6. The backlight module as claimed in claim 5, wherein areas of the diffraction grating units in the diffusion elements progressively increase with increasing distance away from the light incidence surface.

7. The backlight module as claimed in claim 5, wherein grating constants of the diffraction grating units progressively decrease with increasing distance away from the light incidence surface.

8. The backlight module as claimed in claim 5, wherein a fluorescent layer is provided on the bottom surface.

* * * * *